United States Patent [19]

Herbst et al.

[11] 4,128,829
[45] Dec. 5, 1978

[54] SIGNATURE VERIFICATION METHOD AND APPARATUS UTILIZING BOTH ACCELERATION AND PRESSURE CHARACTERISTICS

[75] Inventors: Noel M. Herbst, Mount Kisco; Chao N. Liu, Yorktown Heights, both of N.Y.

[73] Assignee: International Business Machines Corporation, Armonk, N.Y.

[21] Appl. No.: 866,190

[22] Filed: Dec. 30, 1977

[51] Int. Cl.$^2$ ............................................. G06K 9/10
[52] U.S. Cl. ..................... 340/146.3 SY; 340/146.3 Q
[58] Field of Search ............ 340/146.3 SY, 146.3 SG, 340/146.3 AQ, 146.3 Q; 364/819, 823

[56] References Cited

U.S. PATENT DOCUMENTS

| | | | |
|---|---|---|---|
| 3,579,186 | 5/1971 | Johnson et al. | 340/146.3 SY |
| 3,618,019 | 11/1971 | Nemirovsky et al. | 340/146.3 SY |
| 3,699,517 | 10/1972 | Dyche | 340/146.3 SY |
| 3,983,535 | 9/1976 | Herbst et al. | 340/146.3 SY |
| 4,040,012 | 8/1977 | Crane et al. | 340/146.3 SY |

*Primary Examiner*—Leo H. Boudreau
*Attorney, Agent, or Firm*—Roy R. Schlemmer, Jr.

[57] ABSTRACT

Method and apparatus are disclosed for verifying a sample signature based on comparison of the dynamics of a reference and a sample signature. More particularly, second derivative values of pen displacements (i.e. acceleration) and continuous pressure pattern signals are periodically sampled for both a reference and sample signature and a comparison of these second derivative values and pressure patterns is made. To effect the comparisons the two groups (reference and sample) of both second derivative and pressure pattern signals are segmented and corresponding segments are individually correlated. Successive comparisons of the same segment pairs are performed utilizing successive shifting of the phases between the two segments being correlated to find regions of highest possible correlation. A running account of the maximum cross correlation values for all of the segment pairs of the two signatures are kept. Finally, these maximum values obtained for each segment pair comparison are combined and this resultant correlation value is utilized as a verification indicator.

24 Claims, 10 Drawing Figures

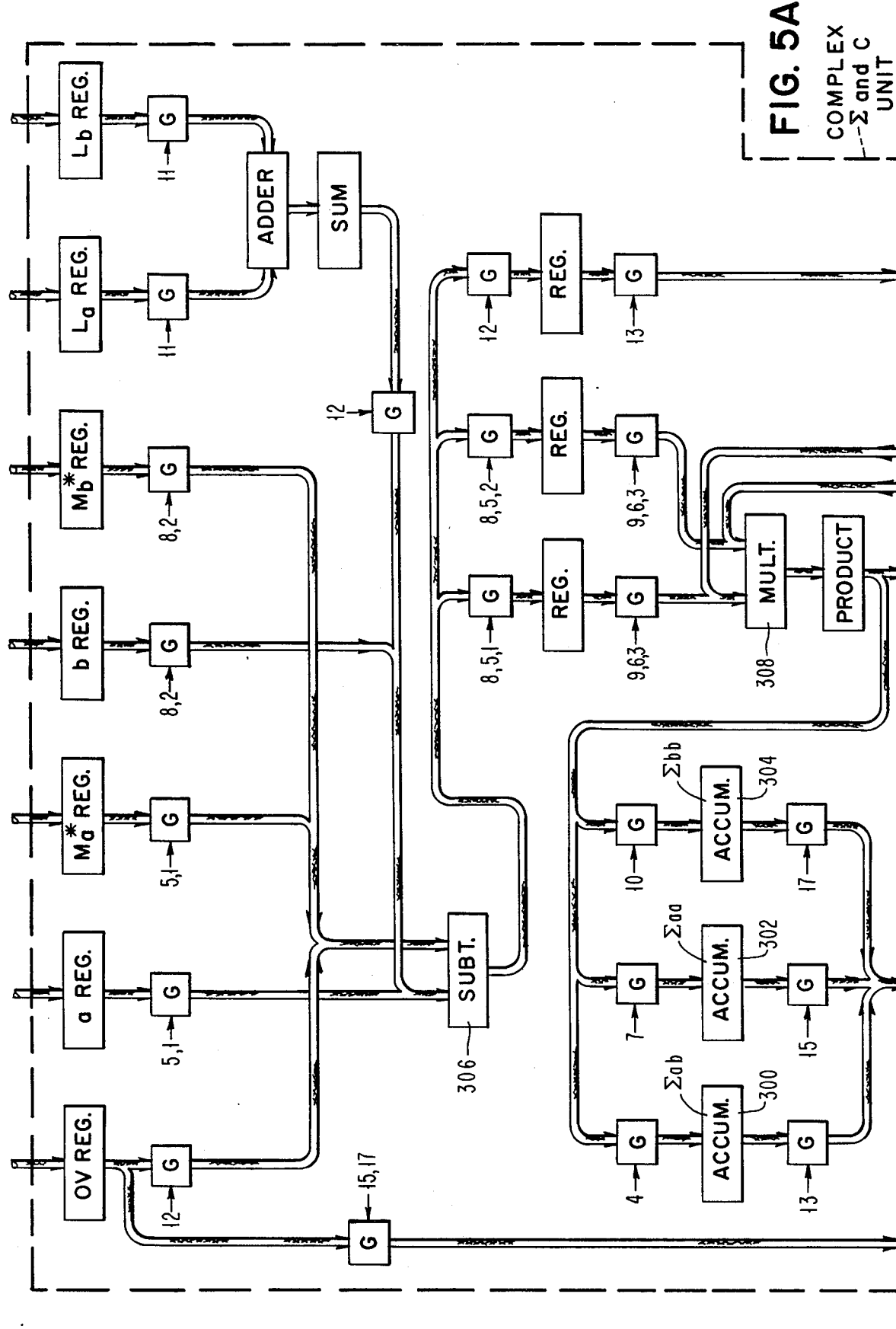

SIGNATURE VERIFICATION METHOD AND APPARATUS UTILIZING BOTH ACCELERATION AND PRESSURE CHARACTERISTICS

BACKGROUND OF THE INVENTION

With the growing use of remote access computer networks which provide a large number of subscribers, access to "data banks" for receiving, storing, processing and otherwise furnishing information of a confidential, financial, or otherwise proprietary nature, the question of security has come to be of increasing concern. Generally, present day computing and/or banking centers have or need elaborate procedures for maintaining physical security at locations where the central processor, data storage, or cash issuing facilities are located. Examples of this type of security are guards, special keys, special password codes that must be entered into a terminal device at the door of the computing or banking central location, etc. Such security procedures, while providing a measure of safety in keeping out unauthorized individuals with respect to physical areas of the facility, are not really effective for remote terminal applications where unauthorized people may, for example, obtain someone else's password, code number, etc., which will then allow them unauthorized access to central system records which could further allow access to unauthorized data, unauthorized issuance of money at a cash issuing terminal, etc.

In relatively recent years, some rather sophisticated cryptographic security systems have been devised and built into banking and other highly secure systems where unauthorized access is undesirable. However, even with these sophisticated systems, if a person somehow penetrates the main system and obtains a secret "key", posing as another authorized user is usually a trivial matter.

It has long been thought possible to devise means for having a remote subscriber or user utilize his own signature as a key to gain entry into the system as with a "voice print", "fingerprint", etc. However, no system has ever been implemented which provides the required degree of security in such handwriting or signature recognition systems without an unacceptable rejection of authorized or valid signatures. Some prior art techniques rely essentially on character recognition and pattern super-position types of analysis methods based on x-y positional data. However, such systems do not work well due to the inherent variability of such positional information.

What is desired is a system which can successfully provide rejection of forged signatures and yet allow a very high percentage of authorized signatures to pass through the system without false rejection. This latter factor is a problem because many signatures vary considerably from time to time depending upon such factors as fatigue, general mental and physical state, writing position, etc. It is, of course, a prime requisite, for such a system to be successful in a commercial environment that it be able to allow for reasonable variations in an individual's signature and still be able to discriminate against forgeries.

PRIOR ART

The present invention is an improvement on U.S. Pat. No. 3,983,535 of Herbst et al. entitled, "Signature Verification Method and Apparatus". This patent discloses a method for verifying signatures utilizing either x or y acceleration values as the particular signature dynamic characteristic which is to be utilized in the verification process. The patent further shows great detail of a means for segmenting both sample and reference signatures and means for performing the comparison or correlation on an individual segment by segment basis. Further means are disclosed for obtaining maximum correlation between individual segment members by a time base or phase shifting operation to recognize regions of high probable correlation. Finally, the individual results are combined to form an overall correlation result which is compared against a predetermined correlation "cut-off" point below which the comparison will give a 'no go' or forged indication. Putative signatures having correlation results better than the cut-off points are assumed to be proper.

U.S. Pat. No. 3,133,266 teaches the recognition of cursive handwriting. The process used in the patent makes an ordered listing of extremals of each letter in a word. The extremals ae normalized to permit operation on different sized handwritings. Positional information as a function of time, is used within the machine disclosed for determining such extremals. Comparison is performed by means of a table look-up of the ordered extremal listing, which is in binary form. Extremals are determined by looking for zero values of the first derivatives of x and y.

U.S. Pat. No. 3,480,911 teaches the use of a signature identification machine which is sensitive to the pressure applied on the stylus. Comparisons of signature are performed on signals which indicate the stylus pressure as a function of time. It should be noted that this type of mechanism detects jumps of the pen or stylus. Experiments have shown that pressure alone as a function of time, is not consistent from signature to signature and has gross characteristics that are relatively easy to imitate. Pressure is consciously determined more in response to what sort of trail the writing instrument happens to be leaving.

U.S. Pat. No. 3,127,588 discloses a mechanism for automatic reading of cursive script. This mechanism does not recognize a particular handwriting with respect to some reference sample, but merely presents a means for detecting characters. This latter patent is characteristic of the character recognition art.

U.S. Pat. No. 3,621,720 discloses an identification system for recognizing individuals by comparing the force exerted during signature as a function of time with a stored pattern of similar information. U.S. Pat. Nos. 3,113,461 and 3,618,019 disclose similar identification systems.

SUMMARY OF THE INVENTION

While a greatly improved Signature Verification Method was disclosed in U.S. Pat. No. 3,983,535 of Herbst et al. based on a single acceleration parameter of the signature dynamic, it has now been found that even greater discrimination in the verification operation is possible utilizing two orthogonally disposed (e.g. x and y) acceleration components together with the pressure patterns which are produced during the writing of the signature and utilizing all three of these individual parameters in the correlation operation. The individual correlations may be performed in a number of different ways as will be set forth, however, the concept of segmenting the sample and reference signatures, correlating individual segment pairs utilizing a series of successive shifts to obtain the maximum possible correlation, weighting said correlations, and finally combining the individual correlation statistics for all segments is identical to that set forth and disclosed in detail in the above-referenced patent.

OBJECTS OF THE INVENTION

It is a primary object of the present invention to provide a signature verification system based essentially on the measurement and comparison of muscle force durations measured as a function of stylus pressures and accelerations for a sample and reference signature.

It is another object to provide such a system utilizing the signature dynamics caused by said muscle force durations in the verification philosophy.

It is yet another object of the invention to provide such a method and apparatus which utilizes both stylus accelerations and pressure patterns occurring during the signature operation and constructing reference and sample tables for both the acceleration and pressure signals which tables are utilized in subsequent correlation operations.

It is a still further object to individually correlate the two orthogonal acceleration components for the sample and reference signatures and combine the results subsequently in the correlation operation.

It is a further object to provide an alternative method and apparatus wherein the correlations for the x and y acceleration components are processed in complex format and are ultimately combined to form a complex correlation wherein the correlation magnitude is utilized for subsequent decision purposes.

It is a still further object of the invention to provide such a method and apparatus wherein the ultimate verification decision is a function of the combination of the cross correlation values for both the orthogonal acceleration components and the pressure pattern component of a reference and a sample signature.

It is a further object to use the x and y accelerations from an oriented input device and an axial pressure measurement correlated individually wherein the individual correlations are combined to form a decision function.

It is another object of the invention to use two orthogonal acceleration components from an unoriented input device, by means of treating the orthogonal pairs as a vector of complex numbers, and carrying out the correlation in complex form; the magnitude of the complex correlation being then combined with the pressure correlation to form the decision function.

It is yet another object of the invention to use the pressure signal to modulate the orthogonal acceleration data, and then perform a single complex correlation on said modulated acceleration signals, the magnitude of which is used for the decision.

Other objects, features and advantages of the invention will be apparent from the following description of a preferred embodiment of the invention which follows.

DESCRIPTION OF THE DRAWINGS

FIG. 5 comprises an organizational drawing for FIGS. 5A and 5B.

FIGS. 5A and 5B comprise a combination functional block and logical schematic diagram of the Complex Summation and Correlator Unit utilized in the Complex SCU of the embodiments of FIGS. 3 and 4.

DESCRIPTION OF THE DISCLOSED EMBODIMENT

Figure 1:
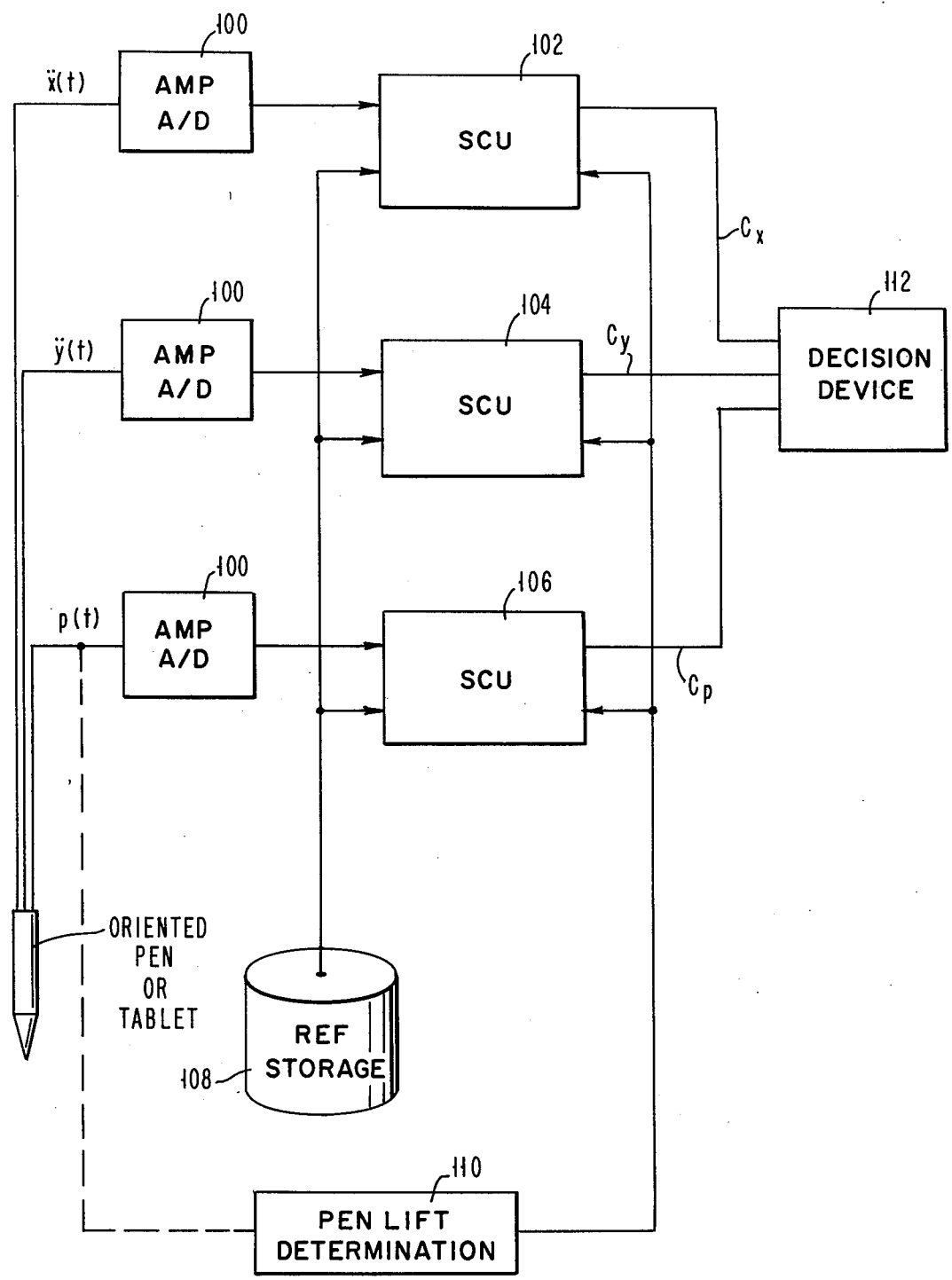
FIG. 1 comprises an overall block diagram of a first embodiment of a signature verification system organized in accordance with the teaching of the present invention.

The objects of the present invention are accomplished in general by an improved method for verifying signatures which comprises utilizing a step-wise analysis of both the acceleration components of pen movement and the pressure patterns developed by said pen during the signature process to develop unique signal patterns characteristic of a given person's signature. The analysis and verification process involves correlating reference sets of signal values obtained during the writing of a known signature with sets of sample signal values obtained during the writing of a putative signature and which reference signal values serve as a verification argument. Subsequent to the correlation of the signal sets, representing pressure signals and acceleration signals, respectively, the results of the correlations are combined and compared against a predetermined minimum correlation value to determine whether a successful comparison has been made.

As in the previously referenced U.S. Pat. No. 3,983,535 of Herbst et al., segmenting both the lists of acceleration values and pressure values in a unique fashion, allows cross-correlation techniques to be used in an extremely effective manner to locate regions of high probable correlation to determine whether the argument sample was, in fact, produced by the same person making the reference sample. Effectiveness and reliability of the cross-correlation technique is greatly enhanced and, in fact, rendered practical by the technique for sliding or shifting the time base of any two segments of the reference and sample respectively to obtain a maximum or optimal match. As was described in said above-referenced patent, the correlation value for said optimal match is however, penalized depending upon the degree of sliding necessary to obtain same.

The concept of segmentation and correlation utilizing said shifting technique is utilized herein for both acceleration signals and also said pressure pattern signals.

According to a preferred embodiment of the present invention two orthogonally disposed acceleration signals are utilized in addition to pressure pattern signals to obtain an optimized recognition result. In one embodiment, for an oriented input device, the x and y acceleration signals are treated separately, and in two other disclosed embodiments where the signals need not be oriented the orthogonal acceleration signals are combined to form a complex value of acceleration at each sampling point and is utilized in the correlation value determination as will be explained subsequently.

The actual operation of the normal signature comparator units (SCU) as disclosed herein is identical to the operation set forth and described in detail in said previously referenced U.S. Pat. No. 3,983,535, and the operation of the complex SCU is almost identical with several exceptions.

The final output or result of the system is a composite corss correlation value or factor for the argument sample against the reference sample which composite value may be used directly or further weighted in making a final verification decision. It will be apparent that this composite signal is a function of the input data, either the pressure signal correlation, or the acceleration signal correlation(s).

Before proceeding with the detailed description of the operation of the actual hardware of the present invention, there will follow a brief description of the theoretical basis for the invention and a description of the anatomical motions which the system senses and analyzes. It has previously been discovered that the accelerations of the stylus, which are proportional to the muscle forces exerted by the signer, are of a predetermined consistent duration when forming particular strokes in a habitual signature. The nature of the process gives rise to various distortions in time axis; e.g. pauses between sections of the name, skipped strokes, decorative rubrics, etc. Thus, typically such a signal is marked by regions of high correlation of unknown duration separated by variable regions of low correlation.

The previously referenced U.S. Pat. No. 3,983,535 disclosed a method of regionally correlating acceleration signals taken during a signature, said method attempts to register these regions, at first based on stylus contact, and subsequently shifts them individually to find a maximal correlation value weighted to penalize the shifting. Finally the results are combined to produce an overall verification value, which is subsequently utilized in the verification decision.

The monitoring of the minutiae of the pressure signals concurrently with acceleration signals, segmenting same and performing an essentially identical cross correlation operation on the pressure signals as well as on the acceleration signals has been found to produce an even higher degree of verification accuracy then was possible utilizing acceleration signals alone. By further utilizing both the X and Y acceleration values in either ordinate or complex form, a still further degree of accuracy is possible.

The dynamics of the way a person signs his name offers an important opportunity to do automatic identity verification. The advantages of such a system are clear, the foremost being the acceptability of a signature for identification from a human viewpoint, the high demands placed upon a forger by having to perform dynamically, and the probability of having economically justifiable hardware, dynamic properties being readily measureable.

Previous work in this direction has not been fruitful. Various investigators have tried to use different combinations of timings, pen pressures, spatial positions and velocities, and even accelerations, but none have been practical because they could not find reliable invariant properties of an individual's signature. This set of invariants, based on a physiological model of how we write, is believed to offer the best prospect of solving signature verification problems.

Research in physiology has shown that in highly practiced compound motions, such as signatures or golf swings, sensory feedback is not used. (More precisely, it applies only over a relatively long time scale). The propagation time between hand-brain-hand restricts feedback effects to be greater than 100 msec, but the muscle contractions, as actually measured, are of shorter duration and are apparently controlled to an accuracy of about 5 msec.

To use a mechanistic analogy, the signer loads a program in his brain calling for his signature. It takes as an input parameter, the desired height. When the program is executed, a sequence of impulses is sent to the individual muscles. The duration and relative timings of these pulses, and hence contractions are completely predetermined. The magnitude of the forces is a variable which is derived from the desired height.

This model has much experimental data and other evidence to support it. In brief, experiments show that the time to write a signature is highly repeatable and fixed to within milliseconds. (The subjects are instructed to write "normally".) The time is invariant with height within broad limits (so long as the mechanical motions of the arm do not have to be changed). Attempting to slow up and write more carefully, generally spoils the accuracy, while to some limit, accuracy increases with speed.

The presently described system extracts pulses from the pen dynamics which correspond to the actual muscle forces, which are the acceleration components of the pen displacement. The system additionally extracts pressure signals from the pen representative of the pressure of the pen on the writing surface.

The gross characteristics of the pressure waveform are heavily influenced by feedback, and are relatively easy to imitate. However, there are small variations in the pressure which are directly related to the ballistic motions of the pen, which are at a much higher frequency, and can supply additional discrimination in conjunction with the basic acceleration comparisons. This additional measurement is available economically since the basic pen-paper contact measurement which supplies the time registration can be readily made to indicate continuous pressure.

A first embodiment of the system is shown in block form in FIG. 1. In the illustrated embodiment, a transducer capable of developing accelerations in both the x and y directions (plane of the paper) as well as pen tip pressure is required. If the input device senses position, then some simple and straightforward processing is required to yield the accelerations. Such a system is disclosed and described in detail in U.S. Pat. No. 3,983,535.

The measured accelerations and pressures are corrupted by noise and quantization effects. These may be removed by suitable low pass filtering. It is important that the time scale be adequate to resolve events to at least ten milliseconds, as this is the accuracy of the muscle timings. The timings of the information signals are then noted relative to the start of motion. (Start of motion may be determined by for instance, the first down motion following a pen switch closure confirming that the pen is in contact with the paper).

The recorded signal sequences are distored by the "glitches" or skips that may momentarily interrupt the process, or added strokes that lengthen the sequence. This requires that the matching be done in segments, neglecting or shifting part of the input data stream if required. Which is to say that the decision scheme must tolerate a certain amount of temporal misalignment even though the start and finish of each pen-down section is well defined.

The significant feature of the present invention is that potential forgers have almost no information or way of knowing how a person writes his name insofar as acceleration or pressure components of the writer's hand motion are concerned. In fact, experiments have shown that even when a prospective forger has been thoroughly apprised of the way in which the present system works, he has no advantage in forming the acceleration and pressure patterns in the forged signature. Successful forgery on this system is a matter of random similarities in motions, and has a very low probability of success.

As stated previously, a signature verification system must decide that one person is a forger and that another person is not, i.e., his signature is that of the person who enrolled under that identification. As will be readily apparent in a cash issuing terminal, remote access computer terminal, or some other similar system for verification of a person's identity, it is very important that forgers and/or unauthorized persons be excluded reliably. It is, however, just as important that authorized individuals be correctly identfied by the verification system without false rejections. This latter factor causes considerable dificulty in any situation where a person's signature is utilized as a test for identity because many individuals' signatures vary considerably from sample to sample. This has been found to be the case even when successive samples are taken, literally consecutively but especially in those situations where considerable time separated successive samples and where environmental factors could be expected to cause signature differences.

The unique features of the invention of the previously referenced patent which allowed a truly operable and highly accurate verification to be made, were two-fold. The first was a discovery of the extremely unique pattern that exists in each person's handwriting relative to the time durations between the zero crossings of the acceleration pattern or curve as detected by a suitable instrumentality connected to the writing instrument. The system also utilizes the fact that even though there may be many spurious noise and other low correlation factors which tend to cause the characteristic acceleration waveform to change shape, that there are still extremely high correlation components within certain areas of said pattern.

Applying this principle to the disclosed method and apparatus, the total handwriting sample waveform is segmented, in this case, utilizing pen lift indicators to achieve such segmenting, and each segment of the reference and sample are paired to each other and correlated in a series of steps or shifts. The acceleration and pressure are individually correlated by this procedure. The most obvious way to do such a cross correlation, would be to line the segments up so that they began at the same point and simply do the cross correlation calculations, however, this has been found to be unreliable due to the variable factors mentioned above. By shifting the start of one segment with respect to the other and in effect, doing the correlation in the overlapping portions of the segments and repeating the shifting and correlating operations a number of times in both directions from the situation when the starting points are aligned, it is possible to discover the high correlation areas.

The correlation figure for each shift position is computed and held until the complete correlation process at all displacement positions has occurred and the system then selects the highest correlation value and takes this as the optimum possible correlation for this segment of the putative signature.

It will be noted from the subsequent detailed description of the various subsystems, that the present embodiment utilizes a maximum displacement of one-fourth or twenty-five percent of the length of the longest of the two segments, whether it be the reference or the sample. Then the shorter of the two segments is shifted with respect to the larger segment. On each successive shift, the shift registers which are used to store the actual second derivative values are shifted by a value of eight until the maximum negative shift has been obtained.

It should of course be understood that each storage position of the shift registers will store an address index or pointer to a value of the particular point on the second derivative waveform or curve for that segment. It will be further appreciated that a different number may be chosen for the maximum shift, either greater or lesser, as well as the magnitude of the shift between successive correlation steps. The numbers one-fourth and eight were chosen as being very convenient to implement in a digital computer of the type utilized in the present embodiment.

Both the reference and sample signature values are forced to have the same number of segments of an approximately equal length although the exact length will, in fact, usually be slightly different. The system automatically analyzes each pair of segments (reference and sample) and automatically performs the above-described shifting operation to obtain the maximum correlation value for each segment comparison until all segments have been appropriately compared and finally, the maximum values are added to produce a final correlation value for the reference and the sample. This, as will be more apparent from the subsequent description, will be true for each signal set pair (i.e. pressure and one or two acceleration sets) and a final or composite correlation value will be produced for the overall signature.

Figure 5B:
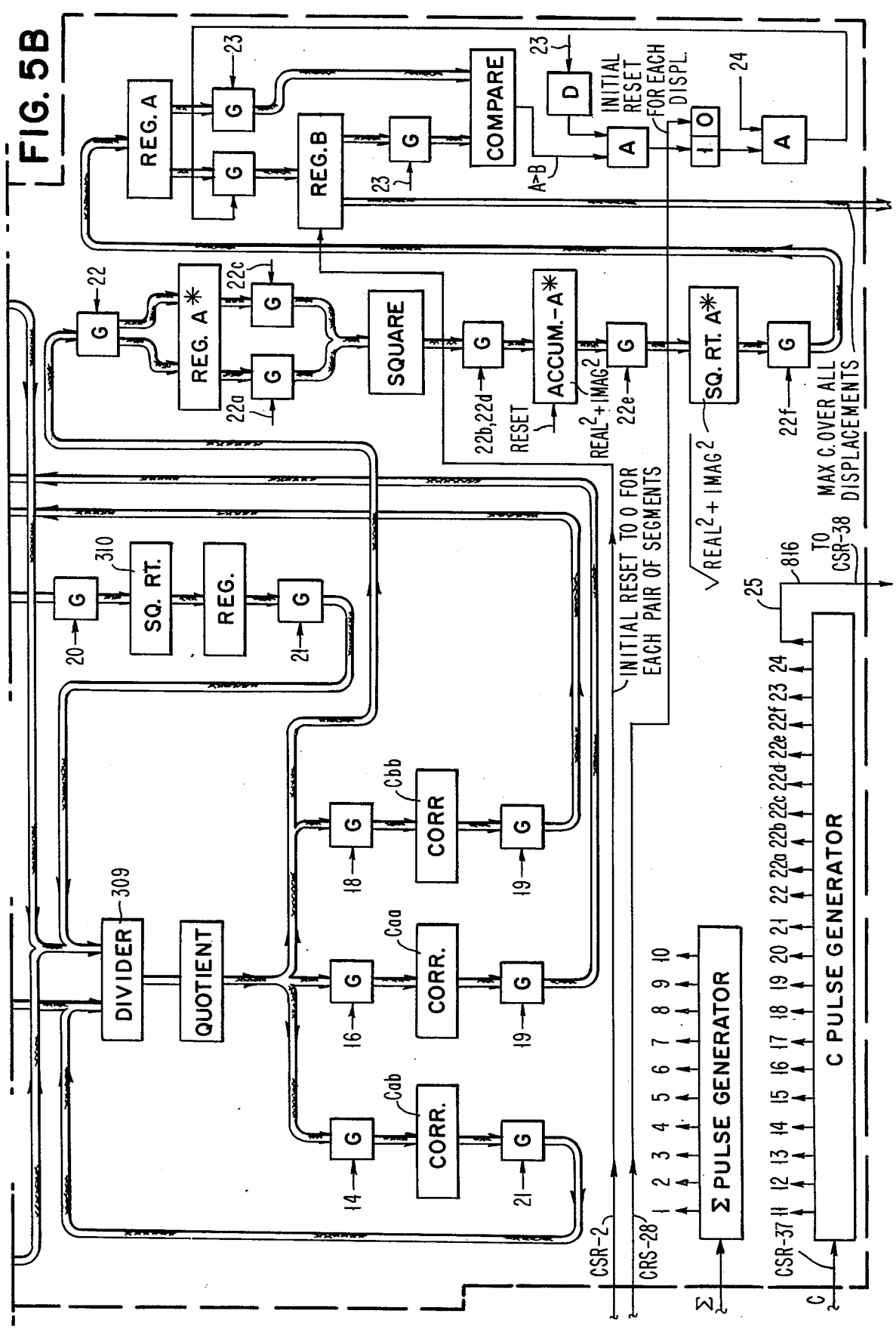
Figure 6A:
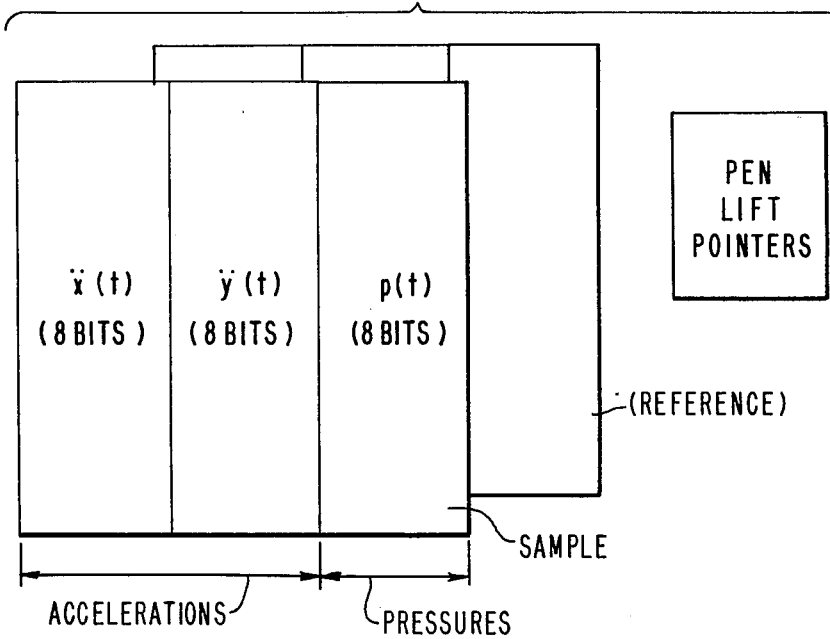
FIGS. 6A-D comprise a diagramatic representation of the input data tables utilized in the present signature verification system.

Before proceeding with the detailed description of the present invention as set forth in the figures it should be clearly understood that the present invention constitutes an improvement over previously referenced U.S. Pat. No. 3,983,535. Accordingly only those features of the present invention which differ from the hardware and system configuration of said patent are specifically disclosed herein. For example the Signature Comparator Unit (SCU) shown throughout the presently disclosed system is virtually identical to that of said previously issued patent. Also, the Complex SCU is very similar to the one dimensional SCU of the above patent with the exception, that an additional arithmetic feature is built in the summation and correlation block as shown in FIGS. 5A and 5B. The storage is modified straightforwardly to accept ordered pairs of accelerations as shown in FIG. 6A. This additional hardware is for computing the magnitude of the complex correlation and is located between gate 22 and Register A, of the simple SCU. Its purpose and function will be described subsequently. Also, the complex SCU performs complex arithmetic throughout as will be explained.

Thus, the present invention incorporates all of the hardware features of the signature verification system of U.S. Pat. No. 3,983,535 as well as utilizing the fundamental concepts segmentation, shifting and cross-correlation extended from one to three dimensions to obtain improved criteria for the ultimate verification decisions.

In the first disclosed embodiment of FIG. 1 it will be noted that there are three large blocks SCU which are in effect duplicates of the signal processing circuitry of U.S. Pat. No. 3,983,535. These three signal processing units in observed process separately and in parallel the three signature parameters of the signature, namely both the X and Y acceleration and also the pressure patterns of the pen stylus on the writing surface. The results of each of these comparisons is accumulated in the respective SCU and the results bound into a final correlation value which is ultimately utilized to determine a successful or non-successful comparison. As stated previously, it has been found that the use of two orthogonally disposed acceleration signals as well as the pressure signals provide a substantially better reject/accept statistic for the system. In other words, the reject rate for forgers is almost one hundred percent while at the same time the reject rate for legitimate signatures is minimal.

Figure 3:
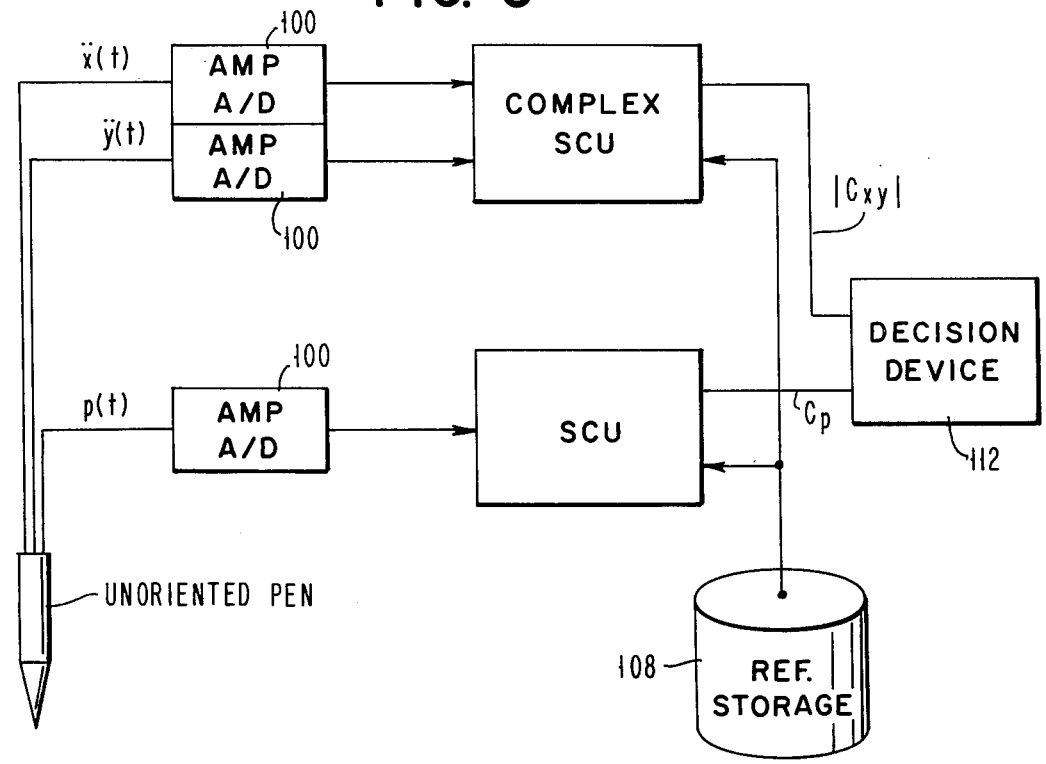
FIG. 3 comprises an overall block diagram of a second embodiment of a Signature Verification System organized in accordance with the teachings of the present invention.
Figure 4:
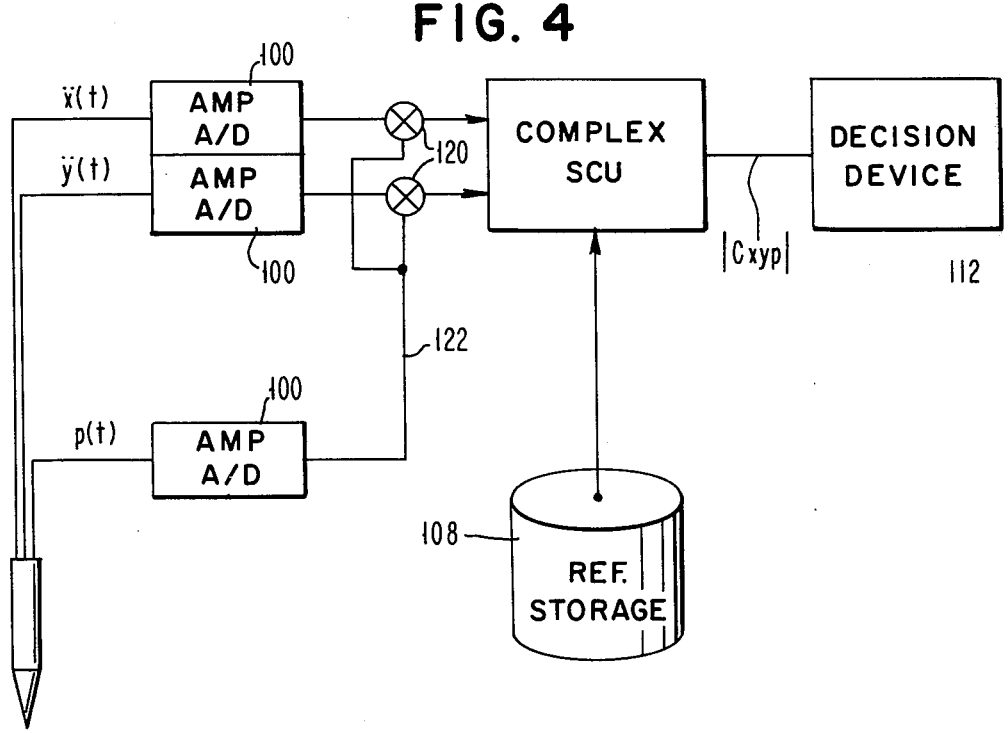
FIG. 4 is an overall block diagram of still another embodiment of the signature verification system of the present invention.

With the present system, information representing the X acceleration component, the Y acceleration component, and the continuous pressure pattern are utilized in the SCU's. The exact manner in which this information or the signals representing same are utilized and processed can take a number of different forms. The system configurations disclosed in FIGS. 1, 3 and 4 are illustrative of three desirable system configurations. All three configurations differ slightly, however, in the exact way the 3 information bearing signals are used. All three basically perform their signal gathering, segmenting, shifting and correlation procedures in virtually an identical fashion to that disclosed, in great detail, in the above-referenced U.S. Pat. No. 3,983,535. It is the manner in which the signals are fed to the summation and correlation units that varies. Thus, in the system configuration of FIG. 1 three separate SCUs are necessary, while in the embodiment of FIG. 3 one SCU of the type specifically disclosed in U.S. Pat. No. 3,983,353 is utilized and one Complex SCU, which is a slightly modified SCU as illustrated herein in FIG. 5, is utilized.

In the embodiment of FIG. 4 only a single Complex SCU is necessary since the pressure signals are utilized to modulate the two orthogonally disposed acceleration signals prior to their entry into the complex SCU.

Having generally described the background of the invention, as well as having generally described the overall underlying principals of the presently improved verification system there will now follow a detailed description of the disclosed embodiments set forth in the figures.

In all three of the disclosed embodiments each of the Signature Comparator Units (SCU's) performs the summation and correlation functions disclosed in said previously referenced U.S. Pat. No. 3,983,535 in exactly the same way in the presently disclosed invention. In each case the input to the SCU is a set of sequential values representing the digitized signals taken continuously from the pen and stored as either the sample or reference signal set. In the embodiment of FIG. 1 it is assumed that the signal values are all quantized in accordance with the "clipped list" subroutine described in said previously referenced patent and because they are clipped values of +1, 0 or −1, relatively small fields, i.e., two bits can represent any value fed into the correlation registers ('a' register, 'b' register FIG. 5A). The format of these lists would be identical whether an acceleration component (either x or y) or a pressure component is being correlated. The use of the quantizing step in the U.S. Pat. No. 3,983,535 may be utilized to save memory space and computational circuitry. However, is anticipated that such a quantizing step would be used. However, it has been found that by use of a full 8 bits of information for each acceleration or pressure component even better discrimination of forgers is possible. Accordingly, in the embodiment set forth in FIGS. 3 and 4, where a Complex SCU is disclosed it is assumed that a full 8 bit wide signal is utilized for each x and y acceleration value as well as for each pressure signal value. In the Summation and Correlation Unit of the Complex SCU all arithmetic is complex and uses the full 8 bits to represent both the real and imaginary values. However, this will be described in detail subsequently.

As will be apparent to anyone skilled in the art when the quantization step is to be deleted the "determine maximum acceleration value" and the "clipped list" subroutines shown in the previously referenced patent are omitted. It is no longer necessary to find the maximum second derivative value for each list of values as this is used as the basis for the quantization step.

Having generally described the background of the invention as well as having generally described the underlying principal of operation of the present improved signature verification system, there will now follow a detailed description of the disclosed embodiments as set forth in the figures.

FIG. 1 comprises a broad functional block diagram of a first embodiment of the invention showing the overall configuration of the system required to perform the requisite signature verification operation set forth and disclosed herein. The input device may be a special purpose tablet and pen assembly including mechanisms for providing a start signal when the pen touches the device and also having appropriate circuitry for indicating pen lifts. It is assumed for the purposes of the present embodiment that the input device disclosed and described is basically a displacement indicator wherein the acceleration or second derivative components must be computed. The computation of acceleration from timed displacement is well known in the art and a specific method and apparatus for performing same is specifically set forth and described with respect to FIG. 2 of said previously referenced U.S. Pat. No. 3,983,535. A stream of pressure patterns might be obtained, for example, by using such a pen as described in U.S. Pat. No. 3,528,295 of Johnson et al entitled "Stylus with Pressure Responsive Transducer". In the specific embodiment shown in FIG. 1 a simplified version is actually shown wherein it is assumed that the acceleration signals x (t) and y (t) are directly available from a pen provided with suitable x and y accelerometers and similarly it is shown that the pressure signal p (t) is available assuming some sort of axially mounted pressure sensitive transducer mounted in the pen. These signals are then passed through the disclosed amplifiers and A/D converters 100, the output each of which is a continuous series of digital signals representative of the instantaneous values of the input to the converters. If it is assumed that the input device utilized is basically a displacement indicator the acceleration or second derivative components would be computed in exactly the same way as shown in said U.S. Pat. No. 3,983,535 for the acceleration values. If on the other hand it is assumed that direct acceleration signals are available this computational step could be deleted and the sampling clock would only be utilized to time the samplings of the x and y acceleration values as well as the pressure values as will be well understood by those skilled in the art.

In the case of the SCU 106, the continuous digital input signals representing pressure would be fed into the SCU and be periodically sampled under control of the sampling clock. The box marked reference storage 108 contains the stored signal sets or records necessary for the comparison of the putative signature against the referenced records. As will be apparent, these records would be compiled and stored in exactly the same way and utilizing identical apparatus as the putative or argument signatures. In the embodiment of FIG. 1, a separate set of reference records would be kept for each of the SCU's as are shown in FIGS. 10A through 10F of U.S. Pat. No. 3,983,535. It being understood that SCU 102, the reference tables would refer to x acceleration values, for SCU 104 the tables would refer to y acceleration values and for SCU 106 the tables would refer to pressure signals.

Box 110 entitled pen lift determination may either be signals from a simple pen lift switch such as utilized in U.S. Pat. No. 3,983,535 or they could alternatively be derived from the pressure transducer as indicated in the figure. In any event, a pulse is produced on the output from box 110 each time a change in pen contact status occurs. This common input goes into each of the SCU's to be utilized for the segmentation operation as was explained in detail in U.S. Pat. No. 3,983,535. The output of each SCU designated by $C_x$, $C_y$, and $C_p$, are the resultant correlation figures for each of the three function performed by the comparator devices of the instant invention. The conclusion is based on the correlation values $C_i$ in accordance with various empirical statistical weighting and sampling techniques in addition to the actual physical operations performed in each signature comparator unit.

The Controller block has various registers, counters and arithmetic units connected thereto and includes the various subsystem individual clocks, which are primarily required for the operation of the signature comparator unit as set forth and described in U.S. Pat. No. 3,983,535. Basically the controller performs the operation of making the various data lists shown in FIGS. 10A through 10F of U.S. Pat. No. 3,983,535, and also controls the final correlation operation between the reference and sample.

It is again reiterated that reference should be made to U.S. Pat. No. 3,983,535 for the extremely detailed description of the operation of one of the individual Signature Comparator Units.

Figure 2:
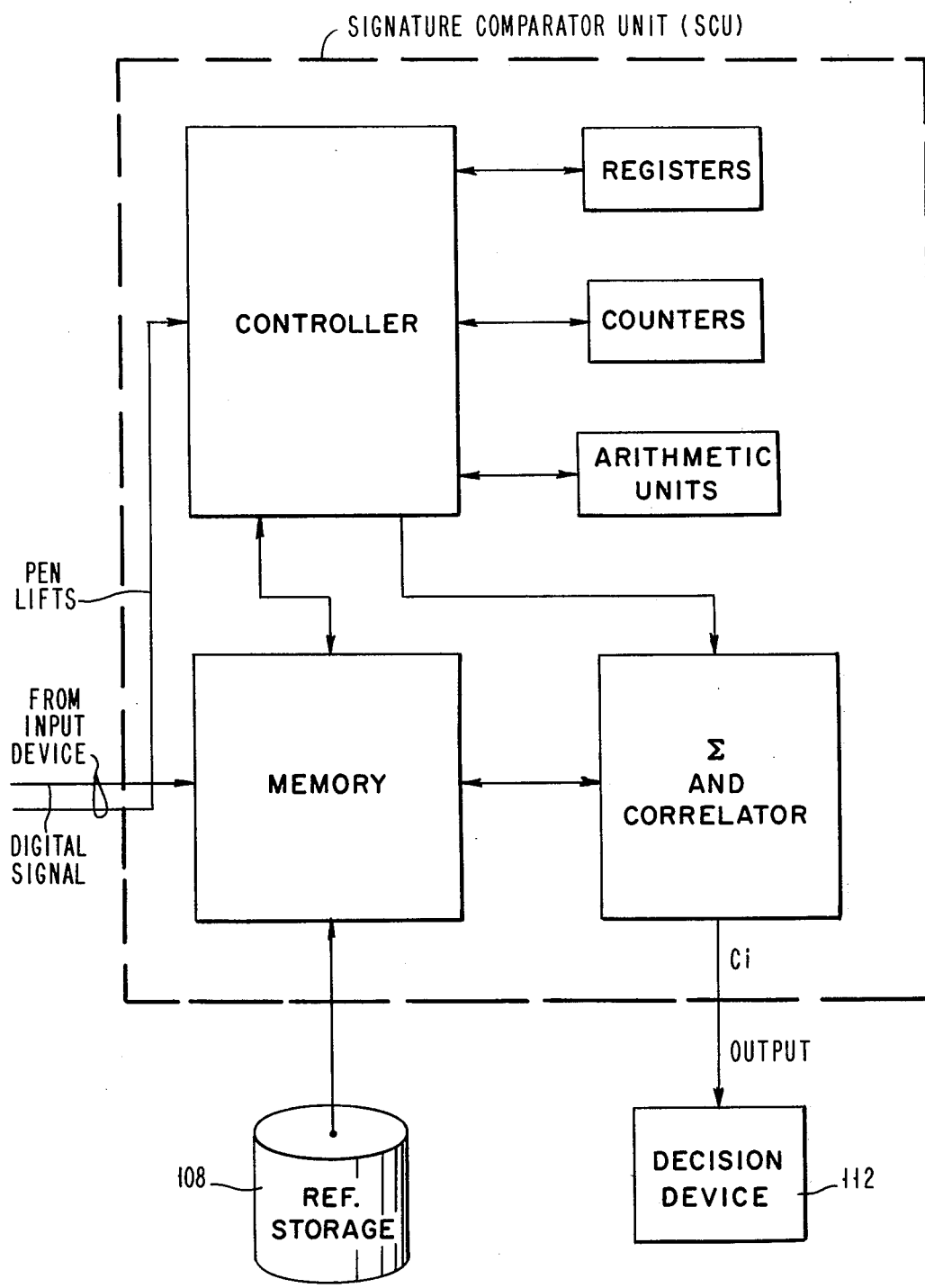
FIG. 2 comprises a functional block diagram of a Signature Comparitor Unit (SCU) as shown in FIGS. 1, 3 and 4.

The Signature Comparator Unit shown in FIG. 2 is the same unit that would be utilized in the embodiments both of FIG. 1 and the lower SCU of FIG. 3. Referring back to FIG. 1 it will be noted that an an oriented pen or tablet is utilized. This means in essence that a shaped pen is utilized so that the person writing the signature will hold the pen assembly in the same position each time that he writes a signature. This may be accomplished by having the pen assymetrically shaped in cross-sections, so that each writer will have a most comfortable position. This assures similar orientation of the accelerometers in the version of the pen described previously wherein accelerometers are utilized to directly produce the acceleration signals. As will be apparent, the pressure signal, especially when using an axial pressure transducer, would not be materially affected by pen orientation.

Thus, to recapitulate, for the most general case of application of the present invention, FIG. 1 shows three parallel signal paths for producing a correlation value for each of the three sampled and monitored characteristics of the signature, namely the x acceleration, the y acceleration, and the pen tip pressure. Each of these three values goes into a separate signature comparitor unit or channel and each produces a separate signature comparator unit or channel and each produces a separate correlation value for comparison against a set of reference values, which resultant correlation value is then fed into a decision device wherein furth statistic and arithmetical weightings may be performed as desired.

The system of FIG. 1 thus utilizes both the x and y acceleration components as well as the pressure signal in reaching a verification conclusion.

It should be noted that the embodiment of FIGS. 3 and 4 $\ddot{x}$ (t) and $\ddot{y}$ (t) acceleration signals are specified as emanating from the pen. However, as will be understood from the present discussion, these embodiments utilize an unoriented pen and thus the acceleration signals become two orthogonally disposed signals.

The embodiment illustrated in FIG. 3 utilizes the same three components, i.e., two orthogonally disposed accelerations and pressure in a somewhat different hardware context. The writing instrument illustrated need not be oriented. It could for example be round and the x and y accelerometers would not require any particular orientation relative to the plane of the paper or primary movement of the pen during the signature process. This is due to the fact that the disclosed complex SCU is utilized to derive a complex correlation value from the instantaneous values of the x and y accelerations at the various sampling times. It has been found that this vector computation and the utilization of the correlation magnitude as computed simply by the pythagorean theorem wherein the hypotenuse is the square root of the sum of the squares of the two correlation components. Since the phase information is ignored, it can be shown that the resultant correlation is rotationally invariant.

A detailed description of the complex SCU will follow relative to the description of FIGS. 5A and 5B, however, in essence what this block does is to utilize a single list of complex second derivative values (x + yi) each having a width of 8 bits which complex list is utilized in exactly the same way in the complex SCU as the list of x or y acceleration values shown and described with respect to the regular signature comparator unit. In other words, the complex list is merely substituted for the non-complex of ordinate values of acceleration.

It should also be noted that in the case of the embodiment of FIGS. 3 and 4 where a complex SCU is utilized, that considerably improved system operation is obtained, i.e., a better discrimination between forger and non-forger, partly because 8 bit wide acceleration values are utilized for both the reference and sample lists for subsequent use in the summation and correlation unit. As stated previously, in order to effect this operation, it is only necessary to utilize wider registers for the acceleration values, i.e., 8 bits instead of 2 bits. All of the other operations are identical to those shown in U.S. Pat. No. 3,983,535. Also as stated previously, it is not necessary to determine the maximum second derivative value or perform the clipped list operation which in effect quantizes the input acceleration values. The operation of this modified version of the system will be described more fully subsequently with reference to FIGS. 5A and 5B and also with reference to FIGS. 6A, B, C, and D wherein the various data tables necessary for operation of this system are shown.

It should be noted in passing, however, that while use of the 8 bit acceleration and pressure values is considered necessary to the embodiment of FIGS. 3 and 4 utilizing a complex SCU, it should be understood that the SCU of FIG. 1 and thus of U.S. Pat. No. 3,983,535 could be readily modified by those skilled in the art to utilize the full 8 bit acceleration values in the correlation operation rather than the quantized or clipped list values.

Returning again to the description of FIG. 3 it is reiterated that the composite acceleration value list utilized in the correlation operations of the complex SCU is a composite of both the x and y acceleration values at any point in time of the pen movement. Thus, the correlation value emanating from the complex SCU in FIG. 3 is designated $C_{xy}$ indicating that its value has both the x and y components factored into same. The value $C_p$ emanating from the regular Signature Comparator Unit designated $C_p$ is a result of the correlation of pressure signals in exactly the same as they were used in FIG. 1. Thus the two correlation values $C_{xy}$ and $C_p$ form the two inputs into the decision device 114.

The function of the Reference Storage Unit 108 is exactly the same in the embodiment of FIGS. 3 and 4 as in the embodiment of FIG. 1.

Similarly, as with the embodiment of FIG. 1, the actual writing implement could either be a positional pen and tablet as previously described herein and also set forth in detail in U.S. Pat. No. 3,983,535 or may alternately be a pen capable of directly producing analog signals representative of the x and y accelerations as well as pressures. Thus, direct conversion of these signals by the A/D converter and amplifiers 100 produces the desired stream of digital signals which may be appropriately supplied by the timing circuitry within each SCU. Again, in the embodiment of FIG. 3, it will be noted that although the signals are combined in a somewhat different fashion in the computational circuitry that both the x and y acceleration values as well as the pressure values are all factored into the ultimate correlation output of the system and may be appropriately combined in the decision block 114 to perform any desired statistical or other arithmetic weighting operation on the correlation values to produce the resultant yes or no verification decision. Referring now to FIG. 4 a somewhat simplified version of the embodiment of FIG. 3 is shown wherein only a single signature comparator is utilized, this time a complex SCU. As in the embodiments of FIGS. 1 and 3, it is assumed that the two orthogonally disposed acceleration and pressure signals are available to the system which may pass through respective amplifiers and A/D converter 100 to produce three digital output signal streams. The two orthogonally disposed acceleration signal streams pass through the two digital modulators 120 which receives a controlling input from the output of the pressure amplifier and A/D converter on line 122 to control the two acceleration signal streams fed to the complex SCU.

Digital modulation as is well known in the art comprises a simple algebraic multiplication of the two data streams. This function may obviously be performed by any well known digital multiplier. The two outputs from the modulators 120 comprise the x and y acceleration values now modulated by the pressure signal stream on line 122. The operation of the complex SCU is exactly the same arithmetically in the embodiment of FIG. 4 as for that just described with respect to FIG. 3. The functional exception is the fact that the two acceleration signal sets are modulated or are proportional to the instantaneous value of the pressure signals. Thus, the output of the complex SCU of FIG. 4 is designated as being a composite correlation value $C_{xyp}$ wherein the subscript p indicates that the pressure signal influences the correlation outcome.

It will of course be understood that in the reference storage 108 the reference signals must be computed on precisely the same hardware as the argument or the putative signal. Thus, the reference storage signals must also pass through exactly the same system as shown in FIG. 4, so that the two orthogonally disposed acceleration values in the reference storage may similarly be modulated by the particular pressure signal which occurred during the compilation of the reference acceleration signal set. Again, the decision device of the embodiment of FIG. 4 is capable of performing desired statistical and arithmetic modification of the vector of the single composite correlation values $C_{xyp}$, for the several signature segments to arrive at a final decision.

It may thus be seen that with all three embodiments illustrated in FIGS. 1, 3 and 4 the ultimate verification decision is based on correlation values utilizing the three input signal streams representative of x acceleration, y acceleration and pressure of the writing stylus. While the hardware details of the three embodiments differ somewhat, the underlying concepts are the same. Similarly, for all three embodiements, ultimately the correlation values $C_i$ are obtained utilizing the segmentation and stepwise correlation operations specifically set forth and described in U.S. Pat. No. 3,983,535.

It is believed that the preceding description of the functional block diagrams of the three embodiments of FIGS. 1, 3 and 4 together with the more detailed description of FIGS. 2 and 5 will enable those skilled in the art to practice the principals and objectives of the present invention.

By utilizing the hardware concepts set forth and described in U.S. Pat. No. 3,983,535 in addition to the improved recognition algorithms and the additional hardware disclosed herein it is possible to provide a greatly improved signature verification system wherein the ultimate correlation figures and thus signature accept/reject decisions are a function of both two-dimensional oriented or unoriented accelerations taken together with pressure patterns developed continuously during the writing of a signature.

Referring to FIGS. 6A through 6D there is shown a diagrammatic illustration of the various sensed and derived data lists necessary for the operation of the present system. This figure is similar to FIGS. 10A through 10F U.S. Pat. No. 3,983,535 and may be readily compared therewith to point up the differences.

Referring to FIG. 6A it will be noted that the basic input table is shown. This table could be utilized for either the embodiment of FIG. 1 or the embodiments of FIGS. 3 and 4 which require a complex SCU. As shown in the figure there are essentially 3 tables of values for pressure, y acceleration and x acceleration. For sake of illustration they are shown as each having 8 bits. In addition there is a list of the pen lift pointers whose use is necessary in the segmentation operations as clearly set forth in U.S. Pat. No. 3,983,535.

At this point it will be noted that there is no Maximum Second Derivative value shown in this table, nor is there a Clipped List as utilized in the previously referenced patent. This, as stated previously, is due to the fact that better discrimination is possible utilizing the full 8 bits rather than the quantized version of the sample and reference values.

Figure 6B:
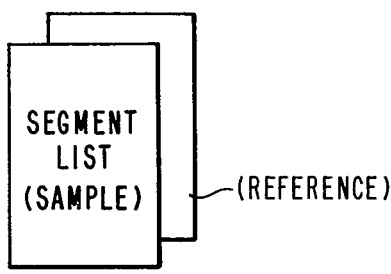
Figure 6C:
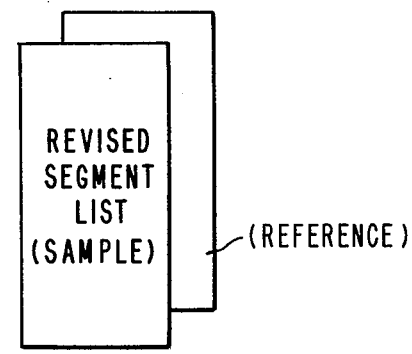
Figure 6D:
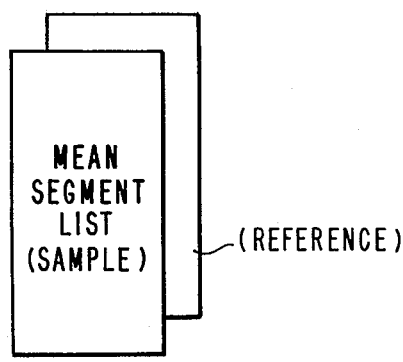

It will also be noted in FIG. 6A that a three section reference table identical to the sample table is utilized. This is required since each section of the table is utilized separately in the various SCU blocks of all three embodiments. FIGS. 6B, 6C and 6D which are the Segment List, Revised Segment List and Mean Segment List are substantially identical to that of U.S. Pat. No. 3,983,535. These same segment lists and their uses are identical for each of the three (or two in the case of FIGS. 3 and 4) SCU's. Since the segmentation and shifting of the relative segments during the correlation routines is performed in an identical manner regardless of whether the values being correlated are pressure signals, y acceleration or x accelerations.

All address, indexing, and data paths remain the same. Only the width of data elements changes, e.g., in complex SCU's, data elements are 16 bits wide. In a one dimensional SCU, elements are 8 bits wide. In the original embodiment, elements were two bits wide.

Referring now to FIGS. 5A and 5B the details of the summation and correlation block of a complex SCU is shown. As will be noted this figure is a combination logical schematic and functional block diagram which is considered to be more than adequate to teach one skilled in the art to construct such a hardware combination.

As stated previously, it is in this section of the hardware of U.S. Pat. No. 3,983,535 that several slight changes must be incorporated in order for the system to handle the complex case, having the general format a + bi. As will be apparent, the real portion of this format would be the x acceleration magnitude and the imaginary portion would be the y acceleration magnitude. In describing the complex SCU it is assumed that full 8 bit wide acceleration values (a total of 16 for x + y) are extracted and stored in the list of second derivative values in memory and as shown in FIG. 6A. This would of course be true for both the reference and sample signature. In the operation of the complex SCU, whenever a reference or sample value is accessed from memory, i.e., the quantities a and b which are stored in the a register and the b register at the top of FIG. 5A. The quantities are transferred into these registers in the complex format of a + bi.

Further, all of the registers and arithmetic units of the summation and correlation block of FIGS. 5A and 5B must be capable of performing complex arithmetic with the exception of square root unit 310. This includes the subtractor 306, the multiplier 308, the divider 309. This is of course in addition to the fact that all registers and gates be capable of automatically routing complex values and storing them in a consistent a + bi format.

There will now follow a somewhat detailed description of the operation of the presently modified summation and correlation unit as is required in the complex SCU of the present invention. It should be clearly understood that reference to all of the various subsystems refers precisely to those subsystems set forth and described in detail in U.S. Pat. No. 3,983,535. It will also be apparent by examining FIGS. 9A and 9B of said patent that in addition to the complex arithmetic capabilities of the present summation and control unit that all clock sequences remain exactly the same in the present system. The additions to the hardware will be observed in correlation pulse generator (C) at the bottom of FIG. 5B and also in the circuitry that lies between register A* and register A. The operation of this hardware will be explained subsequently.

DESCRIPTION OF THE SUBSYSTEM OF FIGS. 5A AND 5B

At the end of the operations performed by the subsystems CC through CH, the seven quantities shown entering the top of the summation and correlation unit shown on FIG. 8J and also in detail in FIGS. 9A and 9B have been computed and the basic CSR subsystem clock takes over to perform the summation and correlation for a particular condition of displacement. Thus, the overlap OV has been computed, the quantities a and b are available from the clipped list in memory, the quantities $M_a^*$ and $M_b^*$ have been computed as are the quantities $L_a$ and $L_b$. It will be apparent that the quantities $M_a^*$, $M_b^*$, $L_a$, $L_b$ and OV are utilized recurrently during a given summation and correlation operation. However, a new a and b value must be accessed from memory for each computation. These are accessed as pairs beginning at the pointer address of the overlapped portion of the segment and proceeding to the end address of the overlapped portion of the segment being correlated. Said end address are stored in either the counter F(LIM) or the counter G(LIM), depending upon which counter is being utilized for control of a given displacement condition.

The actual mathematics of the correlation operation are well known and straightforward; however, this particular form of correlation is specially weighted to penalize shifting, as shown in the following formulas.

$$c_{ab}(k) = \frac{1}{L} \sum_i (a_i - M^*_a)(b_{i-k} - M^*_b) \quad (1)$$

where $$L = L_a + L_b - OV \quad (2)$$

and $$C_{ab} = \frac{\max_k c_{ab}(k)}{\sqrt{c_{aa}(0)\, c_{bb}(0)}} \quad (3)$$

where $c_{aa}$ and $c_{bb}$ are the respective autocorrelations of signatures a and b, and where k is the shift variable (displacement).

In the case of complex correlation, ai and bi will be of the form x + yi, where x, y represent the two orthogonal accelerations. The product in equation (1) becomes $(a_i - m_a^*)(b_{i-k} - m_b^*)'$, where $(b_{i-k} - m_b^*)'$ is the well known complex conjugate of $(b_{i-k} - m_b^*)$.

As is customary, lower case c denotes the raw value of the correlation function, while upper case C denotes the normalized value. The convention form of correlation would use L = OV. The above function penalizes shifting by effectively shifting zeros in behind the signal, and correlating over a large range. This step is quite important in improving the system's discrimination of forgeries.

In the above formulas, it will be seen that $c_{ab}$, $c_{aa}(0)$ and $c_{bb}(0)$ must first be computed as indicated, utilizing data currently available until all of the correlation points for a given displacement condition are obtained whereupon the final correlation for the particular displacement condition as shown in formula (3) is computed.

In the embodiment of the summation and correlation unit shown on FIGS. 5A and 5B, the three accumulators 300, 302, and 304 shown at the bottom lefthand portion of FIG. 5A perform the summation and subtraction operations indicated in equation (1), for $c_{ab}$, $c_{aa}$ and $c_{bb}$ by passing the quantities a, b, $M_a^*$ and $M_b^*$, through the subtractor box 306 (SUBT) and the multiplier box 308 (MULT) where they are accumulated in the aforementioned three accumulation registers 300, 302 and 304. This operation is actually performed during the clock sequences CC through CH (whichever applies) upon issuance of the $\Sigma$ command which produces the clock pulses 1-10 from the pulse generator at the bottom of FIG. 5B.

Finally, the quantities shown in the denominators together with the output of the accumulators 300, 302 and 304 are passed through the divider block 309 (DIVIDER) and are finally placed in the three correlation registers (CORR $c_{ab}$, $c_{aa}$ and $c_{bb}$) shown in the left-hand middle position of FIG. 5B. The contents of these registers are utilized as is shown in the formula (3) to produce the final cross correlation figure for each displacement condition. Thus, the quantities $c_{aa}$ and $c_{bb}$ first pass back through the multiplication block 308 and finally into the square root block 310 (SQ.RT.) after which the result is stored in the register A.

At this point it will be noted that the last step or final operation to be performed as implied by equation (3) is the continuous monitoring as to what constitutes the maximum value for the computed cross correlation. This is done in the system by continually comparing the current computed correlation value with the last maximum value obtained. Thus, for each new comparison only the larger of the two is retained and this automatically becomes the largest current value. However, in the present complex embodiment, each correlation value is a complex number and as is apparent a determination of maximum could take on a number of different forms. It has been determined that successful correlation results are possible in the present invention by converting the computed complex correlation of the form a $+bi$ into the vector c by means of the formula $c = \sqrt{a^2 + b^2}$. This is accomplished in the disclosed hardware by gating the complex number into the Register A* and then first passing the real and then the imaginary portion through the simple multiplier box (SQUARE) and then into the Accumulator A* which now contains the quantity $a^2 + b^2$. This result is then passed through the box (SQARE ROOT) B* which computes the quantity c. This magnitude value is subsequently gated into the Register A. It will be noted that clock pulses 22a through 22f control the data flow between Register A* and Register A as well as the arthmetic sequences required to perform the operation $c = \sqrt{a^2 + b^2}$.

The quantity currently stored in Register A is compared with a previously generated correlation value stored in Register B whereupon a determination of which value is larger is made and the larger one will be automatically placed in Register B. In this way, the largest correlation value obtained for any given segment is automatically available at the end of the correlation computations for a given segment.

The above description of the general operation of the subsystem or subunit of the subsystem of FIG. 8 of U.S. Pat. No. 3,983,535 set forth in FIGS. 5A and 5B herein together with the three equations (1) through (3) completes the overall description of the philosophy of operation of the presently disclosed embodiment. The description of the operation of each of the subsystems of FIGS. 2 through 8 of U.S. Pat. No. 3,983,535 specifically sets forth the data flow paths of the overall system.

CONCLUSIONS

From the preceding description of the operation of the herein disclosed embodiments of the invention which are capable of performing highly precise signature verification, it is apparent that such a system requires a large amount of highly specialized and complex hardware for performing the requisite operations accurately and in real time. It will also be apparent that other overall system architectures are possible while still utilizing the three basic measurements of two accelerations, and a pressure pattern as the basis for the composite cross-correlation function. In two of the disclosed embodiments the pressure of the sample is correlated directly against the reference signature pressure utilizing the same correlating techniques as for the accelerations. In the embodiment of FIG. 4 due to the use of the digital modulators the actual acceleration signals themselves become a function of pressure pattern. It is to be noted however, that in any scheme utilizing the herein disclosed concepts that pressure patterns must be utilized either directly or indirectly in an overall segmentation and relative shifting scheme similar to that disclosed herein which technique was disclosed and claimed per se in U.S. Pat. No. 3,983,535.

Also, while the segmenting operation disclosed in U.S. Pat. No. 3,983,535 and as utilized herein is dependent on pen lifts, because it is believed to provide the best matching criteria (areas of highest possible correlation), it is possible for segmentation to be done, for example, on a straight time division basis.

While a pen fitted with an axial pressure transducer has been utilized successfully in current signature verification experiments utilizing the concept of the present invention, it should also be noted that other pressure transducers mounted within the pen which for example might measure different pressure components have also been utilized. It is accordingly believed that the significant contribution of the present invention is a recognition of the fact that utilizing and correlating the pressure patterns in addition to two orthogonal acceleration patterns forms a valuable adjunct to the recognition process. It is recognized that many variations in the pen geometry which might cause variations in their pressure patterns could readily be developed. It is mandatory that pens having consistent characteristics be utilized both for preparation of the reference signals and subsequent writing of sample signatures if successful verification is to be obtained.

Reference is made to the 'Conclusion' section of U.S. Pat. No. 3,983,535, for a discussion of some of the variations which could occur in the particular cross correlation techniques as used in the individual signature comparison units (SCU's). From this discussion it will be obvious that there could accordingly be a significant amount of variation in the particular manner in which the individual correlation scores coming from each of the SCU's for the embodiments of FIGS. 1 and 3 could be utilized in the final Decision Device. In all cases an accept/reject decision would be course be determined by the final correlation value exceeding or not exceeding a particular norm, say 0.8 where 1.0 would be a perfect correlation or perfect match. For example, in the embodiment of FIG. 1 the three correlation could be added and then divided by 3 for a final value. Alternatively certain correlating values such for example y acceleration ($C_y$) might be weighted over the x acceleration ($C_r$) or pressure ($C_p$). Or conversely the correlating value x acceleration or pressure might be weighted over the other two values. Ultimate cut off levels and weighting ratios would be originally determined and possibly changed based on empirical statistical results obtained from very large testing bases. A simple averaging of ($C_{xy}+C_p$)/2 has proven effective in our device.

As will be apparent from the previous discussion, any departures from the disclosed system architectural embodiment will in all probability necessitate changes in certain areas of the logical and computational circuitry as well as in the control circuit performing same. However, it is believed that these changes would be obvious to those skilled in the art in the light of the wide range of exemplary embodiments disclosed and described herein.

Thus, while the invention has been specifically set forth and described with respect to the specifically disclosed embodiments, it will be readily understood that many departures of the specific design and operation of the system other than those set forth could readily be made by persons skilled in the art without departing from the essential features of the invention as disclosed.

What is claimed is:

1. A method for verifying a signature which comprises producing and storing a plurality of first signal sets, each set comprising a plurality of electrical signals, wherein at least one set represents acceleration forces and another set represents pressure forces, each transmitted by a known signer's hand to a writing instrument during the writing on a writing surface of at least one signature by a known person, producing and storing a plurality of second signal sets each comprising a plurality of electrical signals representative of said acceleration and pressure forces by a putative signer at a different time, segmenting said plurality of first and second signal sets for both the known and putative signatures to facilitate identifying regions of high probable correlation, individually correlating similar segment pairs in corresponding signal sets of said first and second sets representing acceleration components and pressure components respectively, combining the correlation results obtained for all of said regions in all of said sets and utilizing this combined correlation value to produce a resultant correlation level value.

2. A method as set forth in claim 1 wherein the step of segmenting to establish regions of high probable correlation comprises determining when the writing instrument is out of contact with the writing surface during both signatures and using this information to partition both said plurality of first and second signal sets into segments.

3. A method as set forth in claim 2 including the steps of performing successive correlations on each set of segment pairs in said known and putative signatures, wherein the electrical signals representing each segment are displaced with respect to each other a predetermined amount prior to performing each correlation, performing the correlation only in overlapped areas of said segments, forming a plurality of correlations each with different displacement values over a predetermined range and maintaining a running account of the maximum correlation value obtained with each displacement value and selecting the maximum correlation value obtained as the best correlation possible for each of said set of similar segments and utilizing said best correlation values to obtain a final correlation value for the two segments, and performing a similar correlation operation for each segment pair in a given set of values representing said known and putative signatures, repeating said correlation operation for each of said signal set pairs representing acceleration values and pressure values.

4. A signature verification method as set forth in claim 3 wherein the step of obtaining the acceleration components comprises obtaining two acceleration components orthogonally disposed with respect to each other and wherein there is a corresponding signal pair in each of said two signal sets representing said orthogonally disposed accleration values taken at the identical sampling time during the writing of each signature.

5. A signature verification method as set forth in claim 4 including treating the orthogonally disposed acceleration value pairs as a complex number and computing all correlations of sample against reference as complex numbers, and wherein the step of determining the maximum correlation value obtained during a given correlation operation comprises converting said resultant complex correlations to a polar vector and basing the decision as to the maximum correlation value solely on the magnitude of said polar vector.

6. A signature verification method for determining if a putative signer has the same signature as a known signer, said method comprising:

producing and storing a first plurality of signal sets, each set comprising a plurality of electrical signals representing acceleration data and pressure data respectively, taken at predetermined intervals from a writing instrument motion produced by a known signer's hand and transmitted to said writing instrument during the writing of the signature, producing and storing a similar second plurality of signal sets, each signal set comprising a plurality of electrical signals representing acceleration data and pressure data respectively produced by a putative signer, comparing the electrical signals in each of said plurality of first and second sets by cross-correlation techniques to determine the extent of correlation between the two pluralities of sets of acceleration and pressure representative electrical signals, said correlation step including dividing each of said plurality of first and second signal sets into corresponding segments therein, comparing each pair of respective segments in each of said first and second signal sets to determine regions of high probable correlation comprising successively displacing the two segments and correlating same at a plurality of displacements, selecting the maximum correlation value obtained and determining a final correlation value for a given signal set by adding the maximum correlations obtained for each segment pair, combining the correlation values obtained for each of the plurality of signal sets and determining whether a signature is valid or not based on the magnitude of said final correlation value.

7. A signature verification method as set forth in claim 6, including the step of producing and storing two sets of electrical signals representing acceleration data of both the x and y motions of said writing instrument for both said putative and known signer wherein said writing instrument is oriented so that said x and y acceleration data may be ascertained, and further including the step of performing said correlation operations separately on each of said sets of x and y acceleration data to produce separate correlation results for pressure $C_P$, the x acceleration data $C_X$, and the y acceleration data $C_Y$ and combining all three to produce a composite correlation result $C_{XYP}$.

8. A signature verification method as set forth in claim 6, including the step of producing and storing two sets of electrical signals representing acceleration data wherein each set is representative of said acceleration data in two orthogonally disposed directions of the motion of said writing instrument for both said putative and known signer wherein said writing instrument is unoriented, and further including the step of performing said correlation operation on said acceleration data in complex arithmetic form wherein the two sets of electrical signals representing the two orthogonally disposed acceleration components making up each signal set are treated as a single set of complex numbers and converting the resultant complex correlation result obtained by correlating each complex segment pair into a correlation vector whose magnitude only is used to determine the maximum possible correlation result for each said segment pair and for producing the final composite correlation result for said acceleration data.

9. A signature verification method as set forth in claim 8, including the step of digitally modulating continuously the two signal sets of acceleration data representing the two orthogonally disposed acceleration components for both said putative and known signers with the digital pressure signals obtained from said writing instrument, whereby the resultant correlation function produced for said acceleration data becomes a function of said pressure data that it is thereby unnecessary to store and separately correlate the signal sets representing the pressure patterns for said putative and known signatures.

10. A signature verification system comprising means for periodically sampling and storing electrical signals representative of the acceleration component values imparted to a writing instrument on a writing surface during the writing of the signature, means ink for periodically sampling pressure data concurrently with the sampling of said acceleration component values imparted to said writing instrument on said writing surface, means for performing said sampling and storing operations for both a known and a putative signature, the data being stored as first and second signal sets respectively for said known and putative signatures, means for accessing said acceleration representative signal sets and for said known and putative signatures, for performing a cross-correlation analysis thereon, said last-named means including means for locating areas of high probable correlation, means for totalizing said correlation results for each of said areas of high probable correlation into a total correlation value for said acceleration data from said two signatures, means for modifying said total correlation value as a function of said sampled pressure data to produce a composite total correlation value for the two signatures which is a function of the acceleration and pressure data.

11. A signature verification system as set forth in claim 10 including means for periodically sampling and storing two separate sets of acceleration data for each signature, each set representative of acceleration components in two orthogonally disposed directions of said writing instrument motion, and wherein said means for accessing said acceleration representative signal set and for performing a cross-correlation analysis thereon comprises means for accessing both said acceleration data signal sets representing said two orthogonally disposed acceleration and for performing said cross correlation as a function of both of said acceleration components.

12. A signature verification system as set forth in claim 11 wherein said means for accessing and cross correlating comprises means for treating the two orthogonally disposed acceleration component data of both said known and putative signatures as a single complex data set and means for performing said cross-correlation operations on said data in complex arithmetic form and means for converting each complex correlation result into a correlation vector having magnitude only wherein said means for determining said highest probable correlation value and for totalizing the same into a total correlation value perform said operation based on the magnitude of each of said correlation vectors.

13. A signature verification system for use with an oriented writing instrument comprising means for periodically sampling and storing electrical signal sets representative of both the x and y acceleration component values and the pressure component values impartes to said oriented writing instrument on a writing surface during the writing of a known and a putative signature, said last named means including analog to digital conversion means wherein said signals are stored in digital format, separate signature comparison and correlation means (SCU) for processing each of said sets of acceleration component values and pressure component values, wherein each of said signature comparison and correlation means includes means for accessing the corresponding digital signal set for said known and putative signatures, means for performing a stepwise cross-correlation analysis thereon, said last named means including means for locating and computing correlation values for areas of high probable correlation, means for totalizing said high probable correlation values into a total correlation result for said two signal sets and means for combining the outputs of each of said signature comparison and correlation means into a final correlation value for the two signatures being compared which is a continuous function of x any y accelerations and pressure.

14. A signature verification system as set forth in claim 13 wherein said means for locating and computing correlation values for areas of high probable correlation in each of said signature comparisons and correlation means includes means for segmenting the respective signal sets to be accessed by said devices so that each signal set comprises an equal number of segments of approximately the same length and means for performing a stepwise crosscorrelation analysis on corresponding segment pairs of said two signal sets until all segment pairs have been cross-correlated and means for totalizing the correlation results into a total correlation value for said signal sets.

15. A signature verification system as set forth in claim 14 wherein said means for performing said stepwise cross-correlation analysis on individual segment pairs includes means operative to cause each member of segment pair to be successively displaced with respect to each other predetermined distances, means operative so that only overlapped portions of each segment pair are actually cross-correlated and means operative for determining the maximum cross-correlation value obtained for successive cross-correlations of a given segment pair and further means for saving this maximum value for utilization by said totalization means.

16. A signature verification system as set forth in claim 15 wherein the means for segmenting the respective signal sets comprises means for detecting when the writing instrument pressure signal is less than a predetermined value and utilizing said indication to segment the electrical signals comprising the respective data sets.

17. A signature verification system for use with an unoriented writing instrument comprising means for periodically sampling and storing electrical signal sets representative of two orthogonally disposed acceleration component values and the pressure component values imparted to said unoriented writing instrument on a writing surface during the writing of a known and a putative signature, said last named means including analog to digital conversion means wherein said signals are stored in digital format, a first signature comparison and correlation means (SCU) for processing said sets of pressure component values, wherein said signature comparison and correlation means includes means for accessing the corresponding digital signal set for each of said known and putative signatures, means for performing a stepwise cross-correlation anaylsis thereon, said last named means including means for locating and computing correlation values for areas of high probable correlation, means for totalizing said high probable correlation values into a total correlation result for said two signal sets, a complex signature comparison and correlation means (SCU) for processing each of said sets of acceleration component values including means for accessing the corresponding digital signal sets representative of the two orthogonally disposed acceleration components and treating them as two sets of complex signal sets for said known and putative signatures, means for performing a stepwise cross-correlation analysis thereon in complex format, said last named means including means for locating and computing correlation values for areas of high probable correlation by complex arithmetic, means for converting said complex correlation values into a resultant correlation vector and retaining only the magnitude thereof, means for totalizing said resultant high probable correlation vector magnitudes into a total correlation result for said two signal sets and means for combining the outputs of said two signature comparison and correlation means into a final correlation value for the two signatures being compared which is a continuous function of said orthogonal acceleration components and pressure.

18. A signature verification system as set forth in claim 17 wherein said means for locating and computing correlation values for areas of high probable correlation in both said signature comparison and correlation means includes means for segmenting the respective signal sets to be accessed by said means so that each signal set comprises an equal number of segments of approximately the same length and means for performing a stepwise cross-correlation analysis on corresponding segment pairs of said two signal sets until all segment pairs have been cross-correlated.

19. A signature verification system as set forth in claim 18 wherein said means for performing said stepwise cross-correlation analysis on individual segment pairs includes means operative to cause each member of said segment pair to be successively displaced with respect to each other predetermined distances, means operative so that only overlapped portions of each segment pair are actually cross-correlated and means operative for determining the maximum cross-correlation value obtained for successive cross-correlations of a given segment pair and further means for saving this maximum value for utilization by said totalization means and wherein said means for determining the maximum cross-correlation value in said complex signature comparison and correlation means utilizes the resultant correlation vector magnitude as the argument for determining the maximum value.

20. A signature verification system as set forth in claim 19 wherein the means for segmenting the respective signal sets comprises means for detecting when the writing instrument pressure signal is less than a predetermined value and utilizing said indication to segment the electrical signals comprising the respective data sets.

21. A signature verification system for use with an unoriented writing instrument comprising means for periodically producing electrical signal sets representative of two orthogonally disposed acceleration component values and pressure component values imparted to said unoriented writing instrument on a writing surface during the writing of a known and a putative signature,
digital conversion means for converting said signals into digital format,
digital modulation means for continuously modulating the electrical signal sets representing said two orthogonally disposed acceleration components as a function of said pressure component and
means for storing said modulated acceleration component signal sets,
a complex signature comparison and correlation means (SCU) for processing each of said sets of acceleration component values including means for accessing the corresponding digital signal sets representative of the two orthogonally disposed acceleration components for said known and putative signatures and treating them as two sets of complex signal sets,
means for performing a stepwise cross-correlation analysis thereon in complex format, said last named means including means for locating and computing correlation values for areas of high probable correlation by complex arithmetic,
means for converting said complex correlation values into a resultant correlation vector and retaining only the magnitude thereof,
means for totalizing said resultant high probable correlation vector magnitudes into a total correlation result for said two signal sets and
means for combining the outputs of said complex signature comparison and correlation means into a final correlation value for the two signatures being compared which is a continuous function of the two orthogonal acceleration components and pressure.

22. A signautre verification system as set forth in claim 21 wherein said means for locating and computing correlation values for areas of high probable correlation in said complex signature comparison and correlation means includes means for segmenting the respective signal sets to be accessed by said devices so that each signal set comprises an equal number of segments of approximately the same length and means for the same length and means for performing a stepwise cross-correlation analysis in complex format on corresponding segment pairs of said two signal sets untill all segment pairs have been cross-correlated, and means for totalizing the correlation results in vector format into a total correlation value for said signal sets.

23. A signature verification system as set forth in claim 22 wherein said means for performing said stepwise cross-correlation analysis on individual segment pairs includes means operative to cause each member of said segment pair to be successively displaced with respect to each other predetermined distances, means operative so that only overlapped portions of each segment pair are actually cross-correlated and means operative for determining the maximum cross-correlation value obtained for successive cross-correlations of a given segment pair and further means for saving this maximum value for utilization by said totalization means and wherein said means for determining the maximum cross-correlation value in said complex signature comparison and correlation means utilizes the resultant correlation vector magnitude as the argument for determining the maximum value.

24. A signature verification system as set forth in claim 23 wherein the means for segmenting the respective signal sets comprises means for detecting when the writing instrument pressure signal is less than a predetermined value and utilizing said indication to segment the electrical signals comprising the respective data sets.

* * * * *